United States Patent
Kamii et al.

(10) Patent No.: US 9,438,708 B2
(45) Date of Patent: Sep. 6, 2016

(54) MOBILE TERMINAL DEVICE, STORAGE MEDIUM, AND METHOD FOR CONTROLLING MOBILE TERMINAL DEVICE

(75) Inventors: Toshihiro Kamii, Osaka (JP); Keiko Mikami, Matsue (JP)

(73) Assignee: KYOCERA CORPORATION, Kyoto (JP)

( * ) Notice: Subject to any disclaimer, the term of this patent is extended or adjusted under 35 U.S.C. 154(b) by 235 days.

(21) Appl. No.: 14/002,687

(22) PCT Filed: Mar. 1, 2012

(86) PCT No.: PCT/JP2012/055242
§ 371 (c)(1),
(2), (4) Date: Aug. 30, 2013

(87) PCT Pub. No.: WO2012/118147
PCT Pub. Date: Sep. 7, 2012

(65) Prior Publication Data
US 2013/0344921 A1  Dec. 26, 2013

(30) Foreign Application Priority Data
Mar. 3, 2011  (JP) .................................. 2011-045886

(51) Int. Cl.
*H04M 1/02* (2006.01)

(52) U.S. Cl.
CPC ......... *H04M 1/0266* (2013.01); *H04M 1/0235* (2013.01); *H04M 2250/16* (2013.01); *H04M 2250/22* (2013.01)

(58) Field of Classification Search
CPC .................................................. H04M 1/0266
See application file for complete search history.

(56) References Cited

U.S. PATENT DOCUMENTS

| | | | |
|---|---|---|---|
| 8,831,687 B1 * | 9/2014 | Kotab | H04M 1/67 455/566 |
| 2004/0001051 A1 | 1/2004 | Tomizawa et al. | |
| 2005/0231756 A1 | 10/2005 | Maeshima | |
| 2006/0020900 A1 | 1/2006 | Kumagai et al. | |
| 2006/0099938 A1 | 5/2006 | Lee | |

(Continued)

FOREIGN PATENT DOCUMENTS

| | | |
|---|---|---|
| JP | H09-305262 A | 11/1997 |
| JP | 2002-300680 A | 10/2002 |

(Continued)

OTHER PUBLICATIONS

International Preliminary Report on Patentability dated Sep. 12, 2013, issued for International Application No. PCT/JP2012/055242.

(Continued)

*Primary Examiner* — Mazda Sabouri
(74) *Attorney, Agent, or Firm* — Procopio Cory Hargreaves and Savitch LLP

(57) ABSTRACT

A cellular phone includes a first display; a second display; and a CPU which executes a first processing and a second processing according to an input with respect to a display detected by the panel sensors, and displays screens based on the first processing and the second processing on the display, respectively. The CPU executes a control for distinguishing the display displaying the screen in an active state from the display displaying the screen in an inactive state with respect to at least one of the display.

11 Claims, 11 Drawing Sheets

(56) References Cited

U.S. PATENT DOCUMENTS

| | | | |
|---|---|---|---|
| 2006/0183505 A1* | 8/2006 | Willrich | 455/566 |
| 2006/0211454 A1* | 9/2006 | Park et al. | 455/566 |
| 2008/0096611 A1 | 4/2008 | Lee | |
| 2009/0106849 A1* | 4/2009 | Wu | 726/28 |
| 2010/0088634 A1 | 4/2010 | Tsuruta et al. | |
| 2010/0302179 A1* | 12/2010 | Ahn | G06F 1/1618 345/173 |
| 2011/0012931 A1 | 1/2011 | Abe | |
| 2012/0164956 A1* | 6/2012 | Infanti | H04L 67/04 455/68 |
| 2012/0270608 A1 | 10/2012 | Tanabe | |

FOREIGN PATENT DOCUMENTS

| | | |
|---|---|---|
| JP | 2002-368842 A | 12/2002 |
| JP | 200430536 A | 1/2004 |
| JP | 2004-129882 A | 4/2004 |
| JP | 2005-309548 A | 11/2005 |
| JP | 2006-031560 A | 2/2006 |
| JP | 2006-141019 A | 6/2006 |
| JP | 2006-279769 A | 10/2006 |
| JP | 2006-311224 A | 11/2006 |
| JP | 2008-288852 A | 11/2008 |
| JP | 2009-177595 A | 8/2009 |
| JP | 2009-223486 A | 10/2009 |
| WO | 2003077098 A1 | 9/2003 |
| WO | 2008-090902 A1 | 7/2008 |

OTHER PUBLICATIONS

Office Action dated Jun. 17, 2014 issued in counterpart Japanese Application No. 2011-045886.

International Search Report dated Jun. 5, 2012, issued for International Application No. PCT/JP2012/055242.

Office Action dated Jan. 21, 2014, issued in counterpart Japanese Application No. 2011-045886.

Notification of Reasons for Refusal dated Sep. 1, 2015 issued in counterpart Japanese Application No. 2014245077.

Office Action dated Dec. 15, 2015, issued in counterpart Japanese Application No. 2014-245077.

* cited by examiner

MOBILE TERMINAL DEVICE, STORAGE MEDIUM, AND METHOD FOR CONTROLLING MOBILE TERMINAL DEVICE

TECHNICAL FIELD

The present invention relates to a mobile terminal device such as a cellular phone, a PDA (Personal Digital Assistant) and so forth, and a storage medium and a method for controlling the mobile terminal device suitable for use in the mobile terminal device.

BACKGROUND ART

Conventionally, a mobile terminal device having two display surfaces is well known. With this kind of mobile terminal devices, a function to execute an application program (hereinafter, referred to as an "application") and to display screens based on the application on the first display surface and the second display surface, respectively, is provided.

SUMMARY OF INVENTION

Technical Problem

In the above construction, since the first display surface and the second display surface have the same shape, a user has a hard time telling which display surface s/he is operating on.

A mobile terminal device with display surfaces, which are operation targets of the user, that can be easily distinguished, is desired.

Solution to Problem

A mobile terminal device related to the first aspect of the present invention includes a first display module; a second display module; a first detecting module which detects an input with respect to the first display module; a second detecting module which detects an input with respect to the second display module; an executing module which executes a first processing according to the input detected by the first detecting module and executes a second processing according to the input detected by the second detecting module; and a control module which displays a screen based on the first processing executed by the execution module on the first display module and displays a screen based on the second processing executed by the execution module on the second display module. Here, the control module executes a control for distinguishing the display module displaying the screen in an active state from the display module displaying the screen in an inactive state between the first display module and the second display module with respect to at least one of the first display module and the second display module.

A second aspect of the present invention relates to a storage medium which holds a computer program applied to a mobile terminal device. The mobile terminal device includes a first display module, a second display module, a first detecting module which detects an input with respect to the first display module, and a second detecting module which detects an input with respect to the second display module. The computer program provides a computer of the mobile terminal device with functions of executing a first processing according to the input detected by the first detecting module and executing a second processing according to the input detected by the second detecting module; displaying a screen based on the executed first processing on the first display module and displaying a screen based on the executed second processing on the second display module; and executing a control for distinguishing the display module displaying the screen in an active state from the display module displaying the screen in an inactive state between the first display module and second display module with respect to at least one of the first display module and the second display module.

A third aspect of the present invention relates to a controlling method of a mobile terminal device including a first display module, a second display module, a first detecting module which detects an input with respect to the first display module, and a second detecting module which detects an input with respect to the second display module. The controlling method relating to the present aspect includes steps of displaying a screen based on a first processing executed according to the input detected by the first detecting module on the first display module and displaying a screen based on a second processing executed according to the input detected by the second detecting module on the second display module; and executing a control for distinguishing the display module displaying the screen in an active state from the display module displaying the screen in an inactive state between the first display module and the second display module with respect to at least one of the first display module and the second display module.

Advantageous Effects of Invention

According to an aspect of the present invention, it is possible to provide a mobile terminal device, a storage medium and a method for controlling with display surfaces, which are operation targets of the user, that can be easily distinguished.

An advantage or significance of the present invention will become clearer from the description of embodiment, as shown below. However, the following description of embodiment is simply one illustration in embodying the present invention, and the present invention is not limited by what is described in the following description of embodiment.

Figure 1:
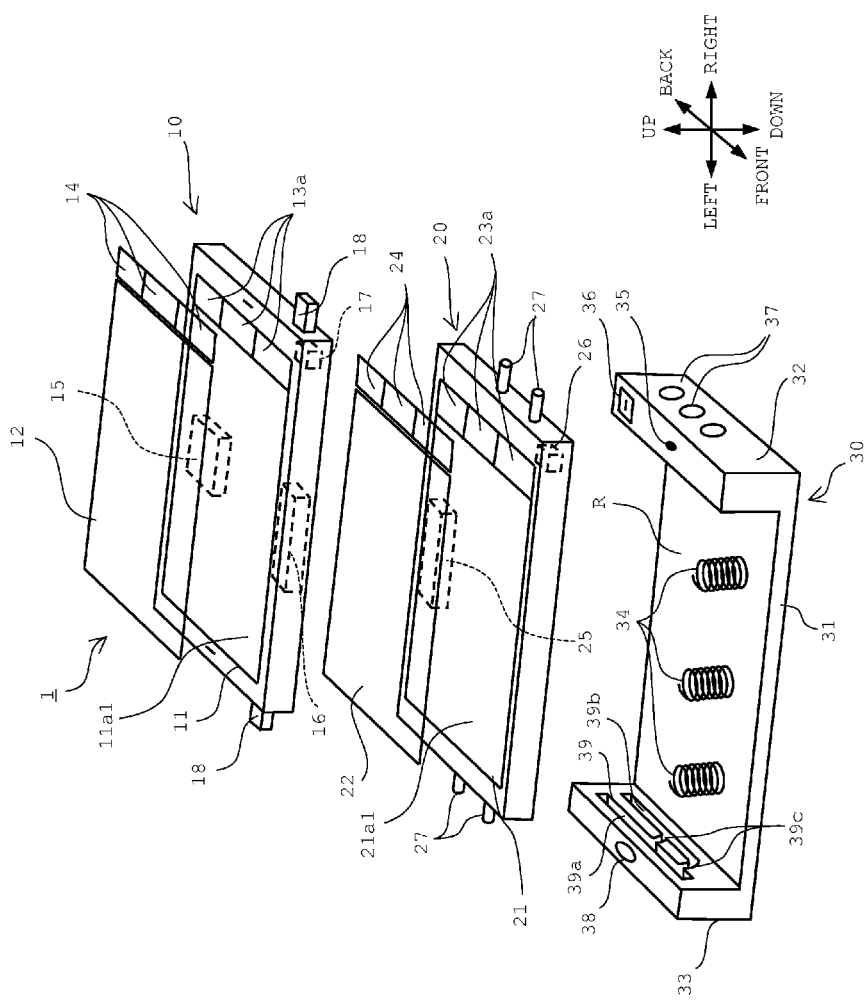
FIG. 1 is a diagram showing an external arrangement of a cellular phone according to an embodiment.

The drawings are entirely used for an explanation for an example of the embodiment, and not intended to limit a scope of the present invention.

DESCRIPTION OF EMBODIMENTS

In the following, regarding to the embodiments of the present invention will be described with reference to the drawings.

In the following explanation, a first display 11 corresponds to a "first display module" recited in the claims. A first panel sensor 12 corresponds to a "first detecting module" recited in the claims. First touch keys K11, K12 and K13 correspond to a "first key module" recited in the claims. A second display 21 corresponds to a "second display module" recited in the claims. A second panel sensor 22 corresponds to a "second detecting module" recited in the claims. A second touch keys K21, K22 and K23 correspond to a "second key module" recited in the claims. The CPU 100 corresponds to an "executing module" and a "control module" recited in the claims. A protruding portion 18, a shaft portion 27 and a guiding groove 39 correspond to a "mechanical part" recited in the claims. It is noted that the description geared the above scope of the claims and the present embodiment is just one example, and it does not limit the scope of the claims to the present embodiment.

<Construction of Cellular Phone>

FIG. 1 is an exploded perspective view showing a configuration of a cellular phone 1. The cellular phone 1 is composed of a first cabinet 10, a second cabinet 20 and a holder 30 which holds the first cabinet 10 and the second cabinet 20.

The first cabinet 10 has horizontally long rectangular solid shape. A first touch panel and first touch keys are arranged on the front surface of the first cabinet 10.

The first touch panel includes a first display 11 and a touch sensor (hereinafter, referred to as a "first panel sensor") 12.

Figure 3:
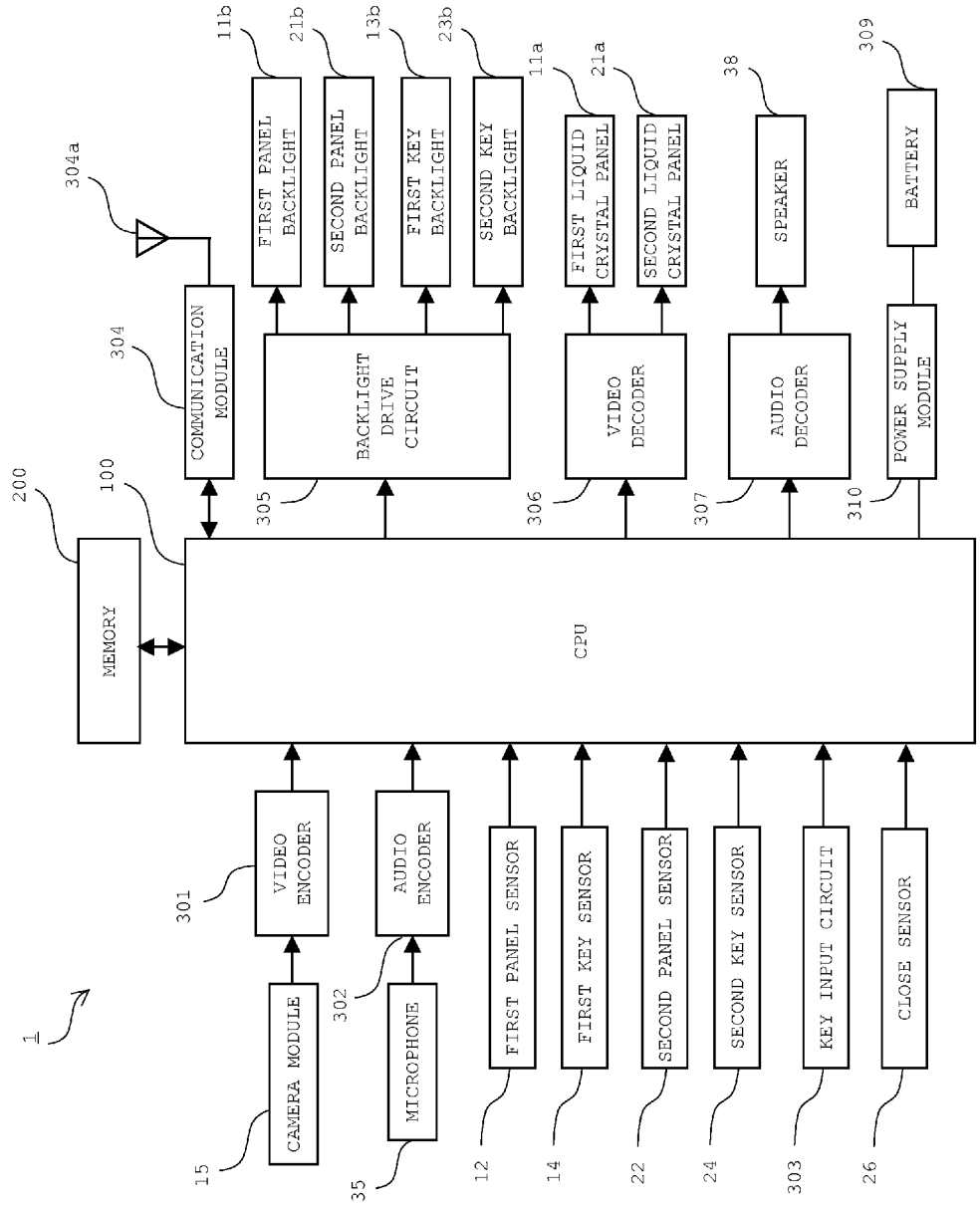
FIG. 3 is a block diagram showing an overall configuration of the cellular phone according to the embodiment.

The first display 11 corresponds to a display module showing an image according to a user's operation on a first display surface 11a1. The first display 11 configured with a first liquid crystal panel 11a and a backlight (hereinafter referred to as a "first panel backlight") 11b (FIG. 3). A first display surface 11a1 is provided on the front surface of the first liquid crystal panel 11a. The first panel backlight 11b includes one or more light sources and illuminates the first liquid crystal panel 11a. The first panel sensor 12 is overlapped on the first display surface 11a1.

The first panel sensor 12 corresponds to a detecting module which detects an input with respect to the first display surface 11a1. The first panel sensor 12 is a transparent rectangle shaped sheet and covers the first display surface 11a1 of the first display 11. The first panel sensor 12 includes a first transparent electrode and a second transparent electrode arranged in a matrix state. By detecting a change in capacitance between these transparent electrodes, the first panel sensor 12 detects an input position on the first display surface 11a1 touched by the user and outputs a positional signal according to the detected input position. The first display surface 11a1 being touched by a user means, for example, that the user touches the first display surface 11a1 with a contact member such as a pen, etc., or a finger. The contact member or the finger touched the first display surface 11a1 can be held still or moved. Also, the length of time the contact member or the finger touches the first display surface 11a1 can be short or long.

One or more first touch keys, in this embodiment, three first touch keys K11, K12 and K13 are arranged adjacent to the first display 11. Each touch key K11, K12 or K13 corresponds to a first key module for inputting predetermined information with respect to the first display 11 (see FIGS. 4(a) and (b)). Each first touch key K11, K12 and K13 includes a panel (hereinafter, referred to as a "first key cover") 13a, a backlight (hereinafter, referred to as a "first key backlight") 13b and a touch sensor (hereinafter, referred to as a "first key sensor") 14. The first key cover 13a displays a predetermined image.

The first key sensor 14 corresponds to a detecting module which detects an input with respect to the first key cover 13a. The first key sensor 14 is, for example, configured with a sensor detecting changes in capacitance, etc. The first key sensor 14 detects the change in capacitance and outputs detecting signal when the first key cover 13a of each first touch key K11, K12 and K13 is touched by a finger or a contact member.

In the first cabinet 10, a camera module 15 is arranged at a position slightly back of a center. A lens window for capturing a subject image in the camera module 15 is provided on the undersurface of the first cabinet 10.

Also, in the first cabinet 10, a magnet 16 is arranged at a center position in the vicinity of the front face, and a magnet 17 is arranged at the right front corner.

Protruding portions 18 are provided on the right and left sides of the first cabinet 10.

The second cabinet 20 has a horizontally long rectangular solid shape and has almost the same shape and size as the first cabinet 10. A second touch panel and a second touch key are arranged in the second cabinet 20.

The second touch panel includes a second display 21 and a touch sensor (hereinafter, referred to as a "second panel sensor") 22.

The second display 21 corresponds to a display module which displays an image according to the user's operation on the second display surface 21a1. The second display 21 is configured with a second liquid crystal panel 21a and a backlight (hereinafter, referred to as a "second panel backlight") 21b (FIG. 3). A second display surface 21a1 is provided at the front of the second liquid crystal panel 21a. The second panel backlight 21b includes one or more light sources, and illuminates the second liquid crystal panel 21a. The first display 11 and the second display 21 can be configured with other display elements such as an organic EL, etc.

The second panel sensor 22 corresponds to a detecting module which detects an input with respect to the second display surface 21a1. The second panel sensor 22 has the same shape and configuration with the first panel sensor 12. The second panel sensor 22 covers the second display surface 21a1 of the second display 21, detects positions on the second display surface 21a1 where the user touches, and outputs positional signals according to the input positions.

One or more second touch keys, in this embodiment, three second touch keys K21, K22 and K23 are arranged adjacent to the second display 21. The second touch keys K21, K22 and K23 correspond to a second key module for inputting predetermined information with respect to the second display 21. Each second touch key K21, K22 and K23 includes a panel (hereinafter, referred to as a "second key cover") 23a, a backlight (hereinafter, referred to as a "second key backlight") 23b, and a touch sensor (hereinafter, referred to as a "second key sensor") 24.

The second key sensor 24 corresponds to a detecting module which detects an input with respect to the second key cover 23a. The configuration and the function of the second key sensor 24 are almost the same with the configuration and the function of the first key sensor 14.

In the second cabinet 20, a magnet 25 is arranged at a center position in the vicinity of a rear face. This magnet 25 and the magnet 16 of the first cabinet 10 attract each other by magnetic force in an open state explained later.

In the second cabinet 20, a close sensor 26 is arranged at the right front corner. The close sensor 26 is composed of a hall IC and the like, for example, and outputs a sensor signal when magnetic force of the magnet 17 is detected. In the later described close state, since the magnet 17 of the first cabinet 10 is in proximity to the close sensor 26, a sensor signal is output from the close sensor 26 to the CPU 100. In contrast, since the magnet 17 of the first cabinet 10 separates from the close sensor 26 when the cellular phone 1 becomes an open state from the close state, the sensor signal is not output from the close sensor 26.

Two respective shaft portions 27 and 27 are provided on both sides of the second cabinet 20.

A holder 30 is composed of a bottom plate portion 31, a right holding portion 32 formed on a right edge part of the bottom plate portion 31, and a left holding portion 33 formed on a left edge part of the bottom plate portion 31.

Three coil strings 34 are arranged on the bottom plate portion 31 so that the coil springs 34 line in a horizontal direction. In a state where the second cabinet 20 is attached to the holder 30, the coil springs 34 abut an underside of the second cabinet 20 and give force to push up the second cabinet 20.

On an upper surface of the right holding portion 32, a microphone 35 and a power key 36 are arranged. A speaker 38 is arranged on an upper surface of the left holding portion 33. Also, a plurality of hard keys 37 are arranged on an outer surface of the right holding portion 32.

On inner sides of the right holding portion 32 and the left holding portion 33, guiding grooves 39 (only that on the left holding portion 33 is shown) are formed. The guiding grooves 39 are composed of an upper groove 39a, a lower groove 39b, and two vertical grooves 39c. The upper groove 39a and the lower groove 39b extend in a forward-backward direction, and the vertical grooves 39c extend upward and downward so as to connect the upper groove 39a and the lower groove 39b.

When the cellular phone 1 is assembled, the shaft portions 27 are inserted into the lower grooves 39b of the guiding grooves 39, and the second cabinet 20 is arranged in a containing region R of the holder 30. The protruding portions 18 are inserted into upper grooves 39a of the guiding grooves 39 and the first cabinet 10 is fitted in the containing region R of the holder 30. The first cabinet 10 is arranged on the second cabinet 20.

In this manner, the first cabinet 10 and the second cabinet 20 are contained in a vertically overlapped state into the containing region R surrounded by the bottom plate portion 31, the right holding portion 32, and the left holding portion 33. In this state, the first cabinet 10 can be slid forward and backward along the upper grooves 39a. The second cabinet 20 can be slid forward and backward along the lower grooves 39b. Also, when the second cabinet 20 moves forward and the shaft portions 27 reach the position of the vertical grooves 39c, the second cabinet 20 is guided by the vertical grooves 39c and becomes vertically slidable.

FIGS. 2(a) to 2(d) are diagrams for illustrating how the cellular phone 1 is switched from a closed state to an open state.

Figure 2:
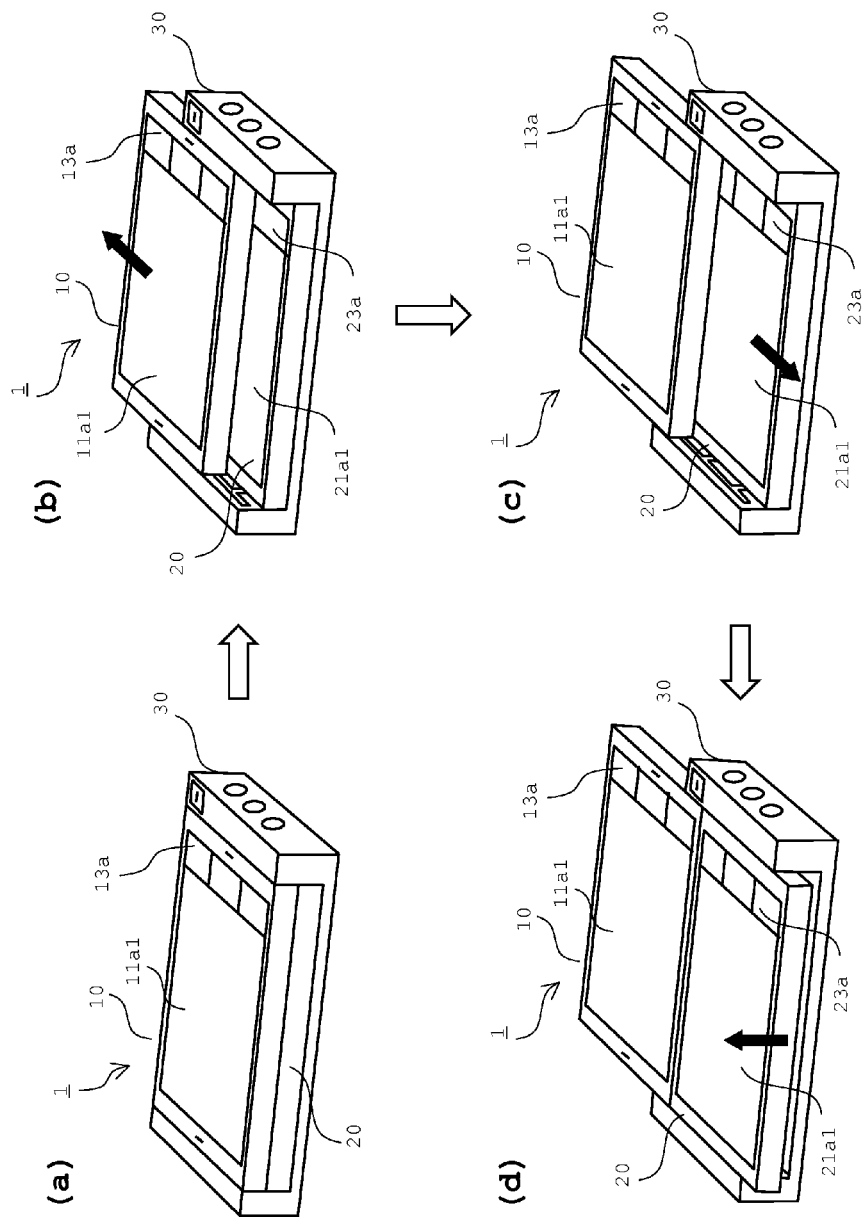
FIGS. 2(a) to 2(d) are diagrams for explaining switching a state of the cellular phone according to the embodiment.

The closed state shown in FIG. 2(a) is a state that the cellular phone 1 is folded. In the closed state, the first cabinet 10 is overlapped on the second cabinet 20. The closed state corresponds to the first configuration that the second display surface 21a1 is covered by the first cabinet 10. In the closed state, only the first display surface 11a1 is exposed to the external.

As shown in FIG. 2(b), the first cabinet 10 is moved backward, and as shown in FIG. 2(c), the second cabinet 20 is moved forward. For this reason, when the close sensor 26 does not detect the magnetic force of the magnet 17, and the sensor signals are not output, the cellular phone 1 is switched to the open state. In this open state, a part of the second display surface 21a1 is exposed to the external.

When the second cabinet 20 does not overlap the first cabinet 10 at all, the shaft portions 27 shown in FIG. 1 reach the position of the vertical grooves 39c. Since the shaft portions 27 can now move along the vertical grooves 39c, the second cabinet 20 can move up and down. At the moment, the second cabinet 20 rises due to elastic force of the coil springs 34 and attraction between the magnet 16 and the magnet 25.

As shown in FIG. 2(d), the second cabinet 20 is closely juxtaposed to the first cabinet 10, and the second display surface 21a1 becomes flush with the first display surface 11a1. The first cabinet 10 and the second cabinet 20 are aligned back and forth, and both of the first display surface 11a1 and the second display surface 21a1 are exposed to the external.

The open state corresponds to the second configuration that at least apart of the second display surface 21a1 is exposed to the external, as shown in FIGS. 2(b) to 2(d).

Also, since the protruding portions 18 move along the upper grooves 39a of the guiding grooves 39 and the shaft portions 27 move along the lower grooves 39b, the vertical grooves 39c and the upper grooves 39a, the close state and the open state can be switched. For this reason, the protruding portions 18, the shaft portions 27 and the guiding grooves 39 correspond to a mechanical part connecting the first cabinet 10 and the second cabinet 20 in a manner the close state and the open state can be switched.

FIG. 3 is a block diagram showing an overall configuration of the cellular phone 1. In addition to the components described above, the cellular phone 1 of the embodiment includes a CPU 100, a memory 200, a video encoder 301, an audio encoder 302, a key input circuit 303, a communication module 304, a backlight drive circuit 305, a video decoder 306, an audio decoder 307, a battery 309 and a power supply module 310.

The camera module 15 has an image pickup device such as CCD, etc. The camera module 15 digitalizes an imaging signal output from the image pickup device, subjects the imaging signal to various corrections such as gamma correction, etc., and outputs the imaging signal to the video encoder 301. The video encoder 301 encodes the imaging signal from the camera module 15 and outputs the imaging signal to the CPU 100.

The microphone 35 converts collected sound into an audio signal and outputs the audio signal to the audio encoder 302. The audio encoder 302 not only converts the analog audio signal from the microphone 35 into a digital audio signal, but also encodes and outputs the audio signal to the CPU 100.

When the power supply key 36 or either key of the hard keys 37 is pressed, the key input circuit 303 outputs an input signal corresponding to the key to the CPU 100.

The communication module 304 converts data from the CPU 100 into a radio signal and transmits the radio signal to base station via an antenna 304a. Also, the communication module 304 converts a radio signal received via the antenna 304a into data and outputs that data to the CPU 100.

The backlight drive circuit 305 applies a drive signal based on a control signal from the CPU 100 to the first panel backlight 11b, the first key backlight 13b, the second panel backlight 21b and the second key backlight 23b. The first panel backlight 11b, the first key backlight 13b, the second panel backlight 21b and the second key backlight 23b turns on by a drive signal from the backlight drive circuit 305, respectively. The first panel backlight 11b, the first key backlight 13b, the second panel backlight 21b and the second key backlight 23b illuminate the first liquid crystal panel 11a, the first key cover 13a, the second liquid crystal panel 21a and the second key cover 23a by lighting, respectively.

The video decoder 306 converts image data from the CPU 100 into video signals which can be displayed on the first liquid crystal panel 11a and the second liquid crystal panel 21a, and outputs these signals to the liquid crystal panels 11a and 21a. The first liquid crystal panel 11a displays an image corresponding to the video signal on the first display surface 11a1. The second liquid crystal panel 21a displays an image corresponding to the video signal on the second display surface 21a1.

The audio decoder 307 decodes an audio signal and a tone signal of various notifying sounds such as a ring tone or alarm sound, etc., from the CPU 100, further converts the audio signal and the tone signal into an analog audio signal and an analog tone signal, and outputs the signals to the speaker 38. The speaker 38 reproduces the audio signal, tone signal, etc., from the audio decoder 307.

The battery 309 is for supplying electric power to the CPU 100 and each module other than the CPU 100, and made of a secondary battery. The battery 309 is connected to the power supply module 310.

The power supply module 310 converts voltage of the battery 309 to the amount of voltage necessary for each module and supplies the voltage to each module. The power supply module 310 supplies electric power fed via an external power supply to the battery 309 to charge the battery 309.

The memory 200 includes ROM and RAM.

A control program for providing the CPU 100 with a control function is stored in the memory 200. The control program includes a control program for executing a control for distinguishing the display module 11 or 21 displaying a screen in an active state from the display module 11 or 21 displaying a screens in an inactive state with respect to at least one of the display module 11 and the display module 21. Also, various applications such as a telephone call, an electronic mail, a web browser, an image display, etc., are stored.

In memory 200, data such as sound data, image data, text data, etc., is saved in a predetermined file format. This data is, for example, photo data taken by the camera module 15, data input from each panel sensor 12 and 22, data taken from outside via communication module 304, etc.

The information related to images displayed on each display surface 11a1 and 21a1 is stored in the memory 200. The images displayed on each display surface 11a1 and 21a1 are, for example, pictures such as icons, buttons photos, and so on, texts input in the text area, etc. The information related to the images includes information of image and the position where the image is displayed on each display surface 11a1 and 21a1. The information of the image of icons, buttons, etc., is constructed by information of processing represented by the image. The information of the processing includes processing targets such as applications, files, etc., and processing contents such as activation, termination and so on.

Information related to the first and the second touch key is stored in the memory 200. The information related to the first and the second touch key includes the information of processing corresponding to each touch key. For example, the first touch key K11 corresponds to information of the processing to display an operation item screen on the first display surface 11a1. The second touch key K21 corresponds to information of the processing to display the operation item screen on the second display surface 21a1. The first touch key K12 and the second touch key K22 corresponds to information of processing to display screens to change setting conditions or screens of predetermined applications on each display surface 11a1 and 21a1. The first touch key K13 and the second touch key K23 corresponds to information of processing to display screens of applications displayed right before on each display surface 11a1 and 21a1.

The CPU 100 drives each module constructing the cellular phone 1 such as the camera module 15, the microphone 35, the communication module 304, each liquid crystal panel 11a and 21a, the speaker 38, etc., according to the control program, based on a signal from the key input circuit 303, each panel sensor 12 and 22, and each key sensor 14 and 24. The CPU 100 executes various applications such as a phone call, e-mails, etc., by driving each module constructing the cellular phone 1.

The CPU 100 executes the processing according to the input by the user as an executing module. In concrete, when each display surface 11a1 and 21a1 is touched by the user's finger, the CPU 100 accepts positional signals corresponding to input positions from each panel sensor 12 and 22. The CPU 100 specifies an image displayed at an input position of a positional signal and information of a processing represented by the image based on the display information of the memory 200. The CPU 100 reads out applications and files which are the processing target from the memory 200, executes the applications, or executes the predetermined processing with respect to the files according to the specified processing information.

For instance, as shown in FIG. 4(a), when the user touches an icon A of an E-mail, the CPU 100 reads out an application A corresponding to the icon A form the memory 200 and activates the application A.

Also, when each key cover 13a and 23a is touched by a user's finger, the CPU 100 accepts a detection signal from each key sensor 14 and 24, and identifies the key sensors 14 and 24 which output the detection signal. The CPU 100 executes a processing corresponding to the touch key detected by the key sensors 14 and 24 according to the information of the processing.

For example, when a user touches the first touch key K11 shown in FIG. 4(a), the CPU 100 reads out the image data of the operation item screen from the memory 200 according to the information of the processing corresponding to the first touch key K11.

The CPU 100 outputs control signals to the video decoder 306 and the backlight drive circuit 305 as the control module. For example, the CPU 100 controls the backlight drive circuit 305 to turn off each panel backlight 11b, 21b and each key back light 13b and 23b. The CPU 100 displays images on each display surface 11a1 and 21a1 by turning on each panel backlight 11b and 21b and by controlling the video decoder 306. The CPU 100 controls the backlight drive circuit 305 to turn on each key backlight 13b and 23b. Furthermore, the CPU 100 controls a contrast, brightness, a size of the screen, transparency of the screen, etc., when the images are displayed on each display surface 11a1 and 21a1.

For example, the CPU 100 displays screens based on applications executed by the executing module on each display surface 11a1 and 21a1. That is, when the application A is activated by the executing module so as the first liquid crystal panel 11a to be an output destination of a screen, the screen of the application A is displayed on the first display surface 11a1, as shown in FIG. 4(b). Also, when the image data of the operation item screens is read out by the execution module so as the first and the second liquid crystal panel 11a and 21a to be the output destination of the screens, the operation item screens are displayed on the first and the second display surfaces 11a1 and 21a1, as shown in FIG. 4(a).

When the screens of different applications are displayed on each display surface 11a1 and 21a1, a display configuration that distinguishes a display displaying an active screen from a display displaying an inactive screen is adopted. Here, the screens based on different applications include the screens of a case that the screens displayed on the first display surface 11a1 and the second display surface 21a1 to be different to each other since the executed application which designates the first liquid crystal panel 11a as an output destination and the other executed application which designates the second liquid crystal panel 21a as an output destination are different. Further, screens based on different applications include the case when the application executed, having the output destinations of the first and the second liquid crystal panels 11a and 21a, is the same, but a plurality of processing for the application is executed in parallel while a screen for a processing is displayed on the first display surface 11a1 and a screen for another processing is displayed on the second display surface 21a1.

For example, as shown in FIG. 4(b), when the first display surface 11a1 is touched by the user, the first panel sensor 12 outputs the positional signal to the CUP 100. The CPU 100 determines that the first screen displayed on the first display surface 11a1 is an active screen based on the positional signal. In this case, the CPU 100 displays a linear bar image on one of the edges on the first screen of the first display surface 11a1 to show that the first screen is in the active state. Further, the CPU 100 turns on the first key backlight 13b and turns off the second key backlight 23b. As a result, the first touch keys become brighter by being illuminated. However, the second touch keys are not illuminated, so the second touch keys are darker compared to the first touch keys. Thus, it is displayed that the screen of the first display surface 11a1 is in the active state and the screen on the second display surface 21a1 is in the inactive state.

Figure 5:
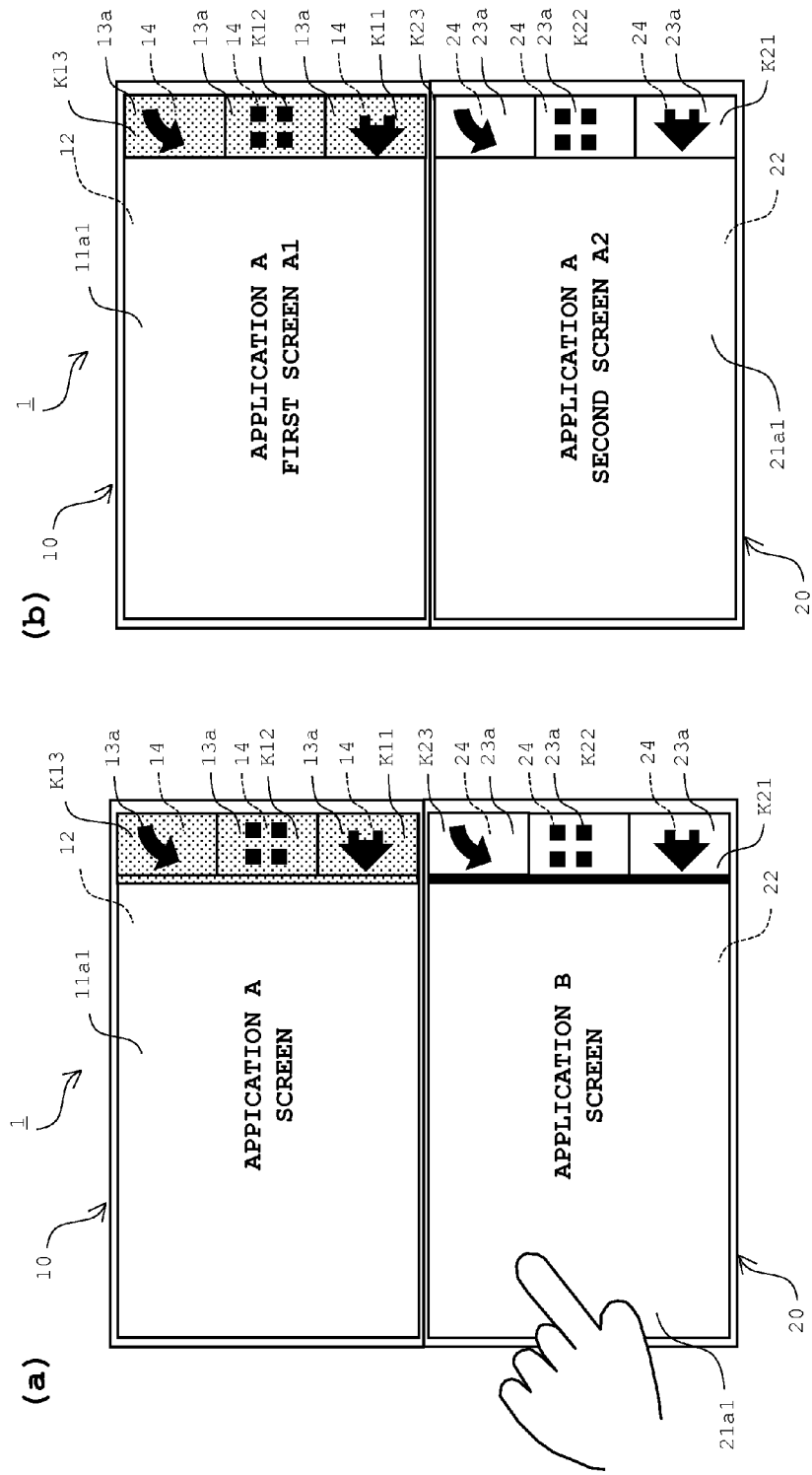
FIGS. 5(a) and 5(b) are diagrams showing the screens of the applications displayed on each display surface according to the embodiment.

On the other hand, as shown in FIG. 5(a), when the second display surface 21a1 is touched by the user, the CPU 100 determines that the second screen 21a1 displayed on the second display surface 21a1 is in the active state based on the positional signal from the second panel sensor 22. In this case, the CPU 100 displays the bar image on the edge of the second screen to show that the second screen is in the active state. Moreover, the CPU 100 turns on the second key backlight 23b and turns off the first key backlight 13b. As a result, it is displayed that the screen of the first display surface 11a1 is in the inactive state, and that the screen of the second display surface 21a1 is in the active state.

When the screens based on the different applications are not displayed on the first and the second display surfaces 11a1 and 21a1, it is not necessary to define the active screen and the inactive screen, therefore the CPU 100 does not execute the display control to distinguish the display displaying the active screen from the display displaying the inactive screen. For example, as shown in FIG. 4(a), when the screen based on the application is displayed on neither of the first and the second display surfaces 11a1 and the 21a1, each predetermined first touch key K11, K12 and K13 is turned off, and each second touch key K21, K22 and K23 is turned on. Also, as shown in FIG. 5(b), when screens A1 and A2 based on an application A are displayed on the first and the second display surfaces 11a1 and 21a1, each predetermined first touch key K11, K12 and K13 is turned off, and each second touch key K21, K22 and K23 is turned on.

Here, the state where the touch keys are turned on is in an active state, and the state where the touch keys are turned off is in an inactive state. For this reason, even when the touch keys in the inactive state are touched, the CPU 100 does not execute a processing according to the input position. Also, when the touch keys in the inactive state are touched, the CPU 100 turns on the touch keys so as to be in the active state.

<Procedures for Processing of the First Embodiment>

Figure 6:
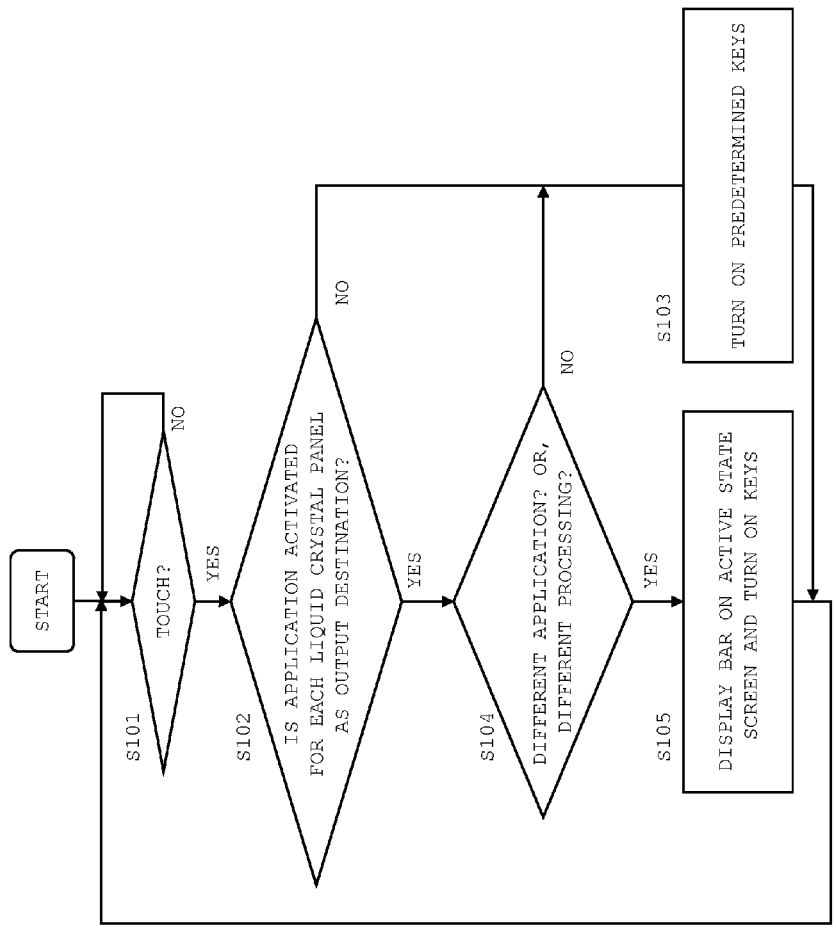
FIG. 6 is a flow chart showing procedures for processing of display controls for distinguishing a display displaying an active screen from a display displaying an inactive screen according to the embodiment.

FIG. 4(a) is a diagram showing an operation item screen displayed on the first and the second display surfaces 11a1 and 21a1. FIG. 4(b) is a diagram showing a screen of an application A displayed on the first display surface 11a1 and a screen of an application B displayed on the second display surface 21a1. FIG. 5(a) is a diagram showing the screen of the application A displayed on the first display surface 11a1 and the screen of the application B displayed on the second display surface 21a1. FIG. 5(b) is a diagram showing a first screen A1 of the application A displayed on the first display surface 11a1 and a second screen A2 of the application A displayed on the second display surface 21a1. FIG. 6 is a flow chart showing procedures of a display control for distinguishing a display displaying an active screen from a display displaying an inactive screen.

When a function executing the display control is set to distinguish the display displaying the active screen from the display displaying the inactive screen, a display control processing is executed by the CPU 100. With this execution of the display control processing, an image showing the active state is displayed on the screen in the active state. With the execution of the display control processing, further the touch keys corresponding to the display surface 11a1 or 21a1 displaying the screen in the active state are turned on, and the touch keys corresponding to the display surface 11a1 or 21a1 displaying the screen in the inactive state are turned off.

In a state where each predetermined screen is displayed on the first display surface 11a1 and the second display surface 21a1, the CPU 100 monitors whether each display surface 11a1 and 21a1 are operated on or not (S101).

When each display surface 11a1 and 21a1 is touched (S101: YES), it is determined whether the application is executed or not so as each liquid crystal panel 11a1 and 21a1 to be an output destination (S102). As an example, as shown in FIG. 4(a), when the operation item screens are displayed on each display surface 11a1 and 21a1, the application is not executed (S102: NO). In this case, since the user does not need to identify the active state or the inactive state, the CPU 100 turns on each predetermined second touch key K21, K22 and K23, and turns off the other first touch keys K11, K12 and K13 (S103).

Figure 4:
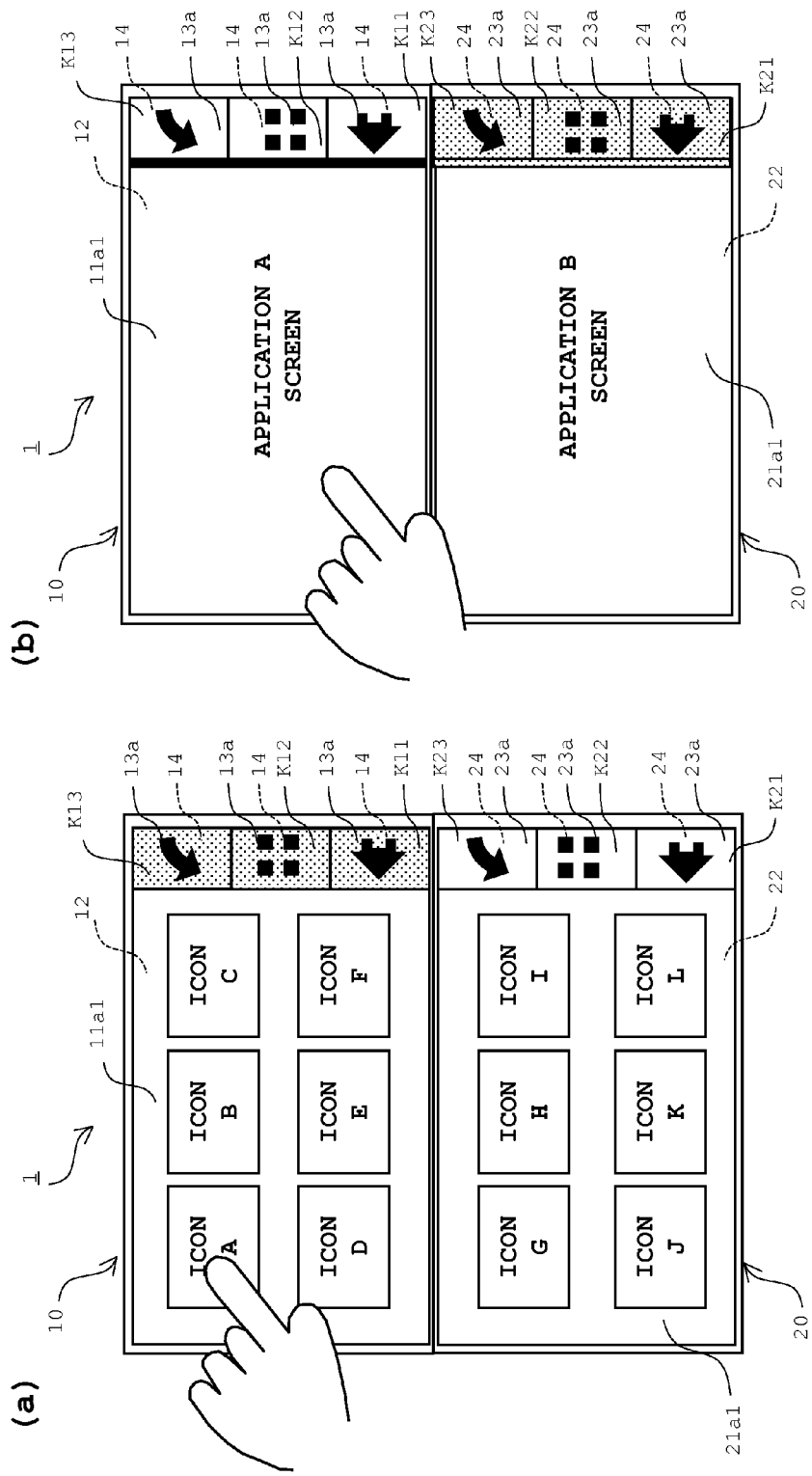
FIGS. 4(a) and 4(b) are diagrams showing operation item screens displayed and screens of applications displayed on each display surface according to the embodiment.

Also, in the operation item screen shown in FIG. 4 (a), when the icon A is touched by the user, the CPU 100 activates the application A represented by the icon A so as a first liquid crystal panel 11a to be an output destination of the screen, and displays the screen of the application A on the first display surface 11a1. The CPU 100 keeps the state to display the operation item screen on the second display surface 21a1. In such a state, when each display surface 11a1 and 21a1 is touched (S101: YES), since the application is not executed for the second liquid crystal panel 21a as the output destination (S102: NO), the state that each predetermined second touch key K21, 22 and 23 is turned on and each first touch key K11, K12 and K13 is turned off is kept (S103).

Next, in a state where the screen of the application A is displayed on the first display surface 11a1, and the operation item screen is displayed on the second display surface 21a1, when an icon G on the operation item screen is touched, the CPU 100 activates the application B so as the second liquid crystal panel 21a become the output destination of the screen, and displays the screen of the application B on the second display surface 21a1 (see FIG. 4(b)). In such a state, when each display surface 11a1 and 21a1 is touched (S101: YES), it is determined that the applications A and B are activated so as each liquid crystal panel 11a and 21a to be as the output destination (S102: YES).

Next, each application which executes each liquid crystal panel 11a and 21a as the output destination is different to each other or not, or each processing of the application is different to each other or not (that is, whether different processing for the same application is executed on each liquid crystal panel 11a and 21a separately and independently or not) are determined (S104). Here, the application A and the application B do not match, so it is determined that the applications are different (S104: YES).

As shown in FIG. 4(b), when the first display surface 11a1 is touched, the CPU 100 sets the screen of the application A displayed on the first display surface 11a1 as an active state. Then, the CPU 100 displays the bar image showing that the screen of the application A is in the active state on the edge of the screen of the application A (S105). Further, the CPU 100 turns on each first touch key K11, K12 and K13, and turns off each second touch key K21, K22 and K23 (S105). For this reason, the user is notified that the screen of the application A displayed on the first display surface 11a1 is in active state, that is the screen of the application A is an operation target by the user.

Secondly, as shown in FIG. 5(a), when the user touches the second display surface 21a1 (S101: YES), the CPU 100 makes the transition for the screen of the application B displayed on the second display surface 21a1 into an active state. In an example, as shown in FIG. 5(a), each liquid crystal panel 11a and 21a is set as the output destination, and the different application A and B are already activated (S102: YES, S104: YES). For this reason, the CPU 100 displays the bar image showing the active state on the second display surface 21a1, instead of the first display surface 11a1 (S105). Further, the CPU 100 turns on each second touch key K21, K22 and K23, and turns off each first touch key K11, K12 and K13 (S105). As a result, the user is notified that the screen of the application B displayed on the second display surface 21a1 is in active state, that is the screen of the application B is an operation target by the user.

Also, for example, from a state that the application A and the application B are executed shown in FIG. 5(a), the application B can be terminated. Upon the termination of the application B, the CPU 100 displays the first screen A1 of the application A on the first display surface 11a1 and the second screen A2 of the application A on the second display surface 21a1, as shown in FIG. 5(b). In this display configuration, the application is activated so as each liquid crystal panel 11a and 21a to be the output destinations (S102: YES), the user's operation target is only one, which is the application A (S104: NO). Thus, since it is not necessary to identify the active state, the CPU 100 deletes the bar image showing the active state, further turns on each predetermined second touch key K21, K22 and K23, and then turns off each first touch key K11, K12 and K13 (S103).

According to the present embodiment, in a state where screens based on different applications or different processing are displayed on each display surface 11a1 and 21a1, when an operation is performed on the display surfaces 11a1 and 21a1 by the user, the bar is displayed on the display surface to be the operation target based on the operation between the display surfaces 11a1 and 21a1. That is, the screen which is the target of the operation by the user is notified to the user. Thus, it is easy to see that the screen is made active by the operation of the user.

Also, according to the present embodiment, when the screens displayed on the display surfaces 11a1 and 21a1 are in the active state, the touch keys corresponding to the display surfaces 11a1 and 21a1 are turned on. Thus, for the user, it is easier to see that the screens are in the active state, and further it is easy to see that the input for the touch keys is in a state to be accepted.

Further, according to the present embodiment, even when the screens are displayed on the first and the second display surfaces 11a1 and 21a1, if the screen is the screen based on one processing regarding one application, a display configuration to distinguish whether the screen is active or not is not taken. For this reason, the user can easily see that the operation target is a screen based on one processing for one application.

<The Second Embodiment>

In the first embodiment, by displaying an image showing an active state on a screen in an active state, and by turning on or off touch keys, a control to distinguish a screen of an active state from a screen of an inactive state is executed. In contrast, in the second embodiment, by lowering the brightness of the screen in the inactive state compared to the brightness of the screen in the active state, the control to distinguish the screen in the active state from the screen in the inactive state is executed.

Figure 7:
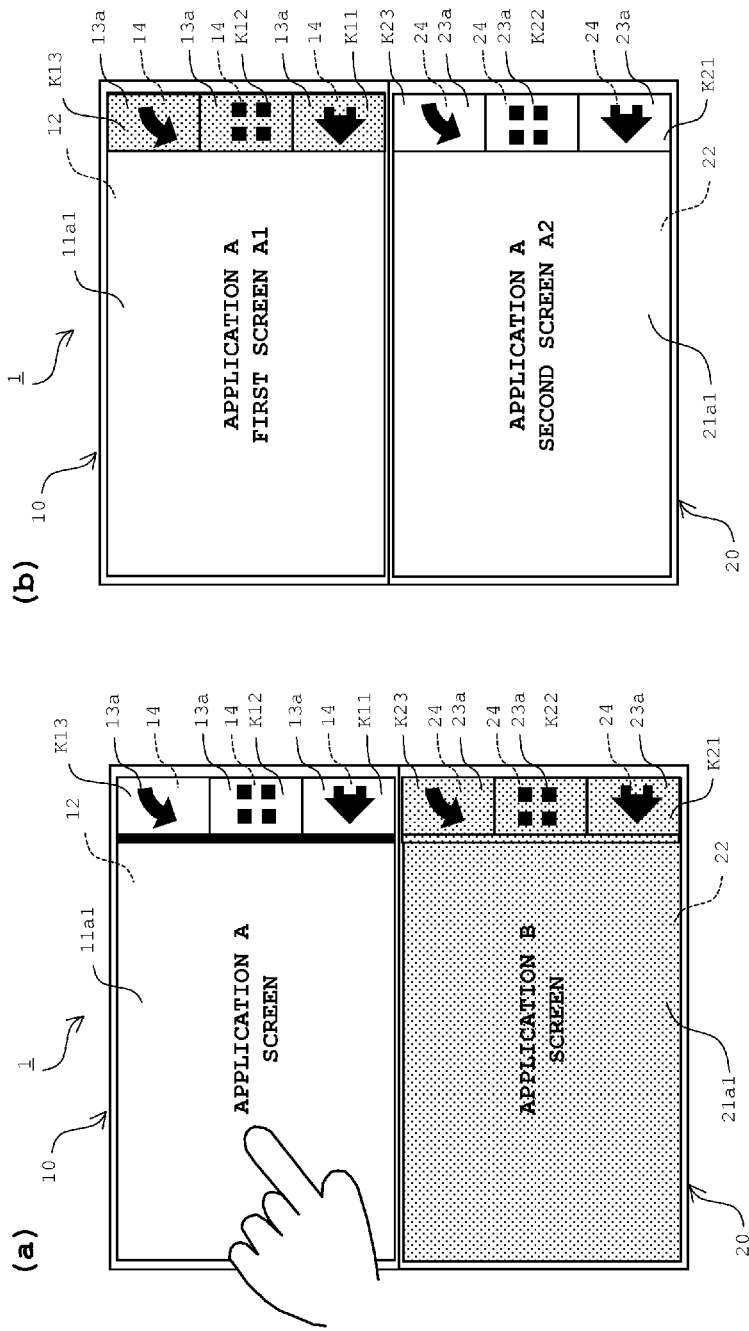
FIGS. 7(a) and 7(b) are diagrams showing the screens of applications displayed on each display surface according to the embodiment.
Figure 8:
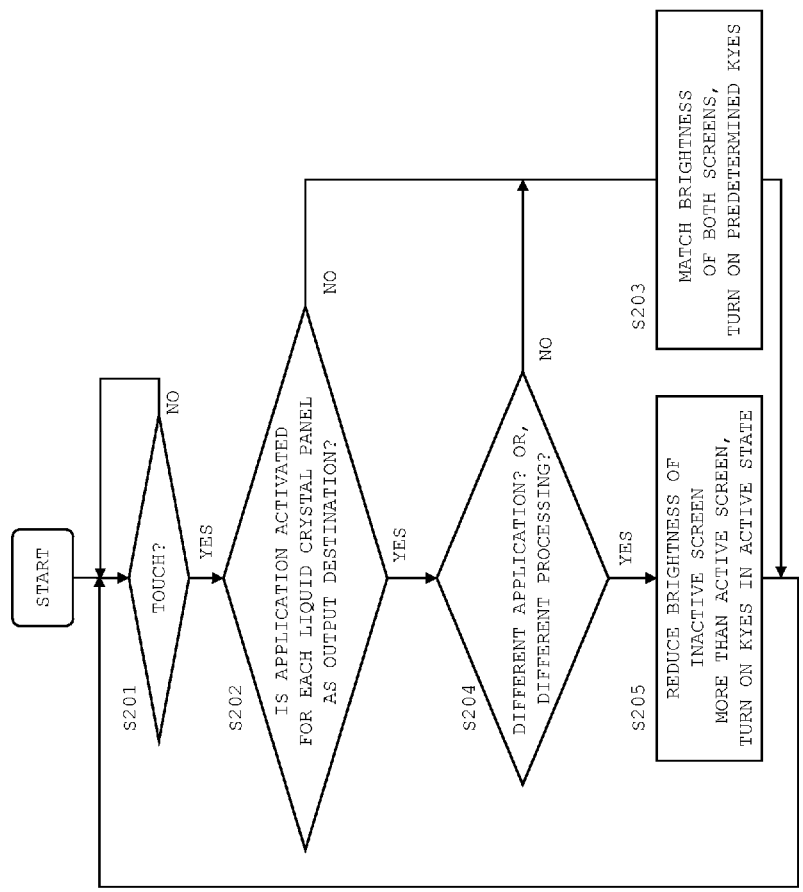
FIG. 8 is a flow chart showing procedures for processing of display controls for distinguishing the display displaying the active screen from the display displaying the inactive screen according to the embodiment.

FIG. 7(a) is a diagram showing a screen of an application displayed on the first display surface 11a1 as an active screen and a screen of an application B displayed on the second display surface 21a1 as an inactive screen. FIG. 7(b) is a diagram showing a first screen A1 of the application A displayed on the first display surface 11a1 and a second screen A2 of the application A displayed on the second display surface 21a1. FIG. 8 is a flow chart showing a processing procedure of a display control for distinguishing a display displaying an active screen from a display displaying an inactive screen.

Since the processing of S201, 202 and S204 in FIG. 8 is the same with the processing of S101, S102 and S104 in FIG. 6, respectively, an explanation is not repeated.

As shown in FIG. 7(a), when the first display surface 11a1 is touched by the user (S201: YES), when different applications A and B are activated having each liquid crystal panel 11a and 21a as output destinations (S202: YES, S204: YES), the CPU 100 lowers the brightness of the screen of the application B which is the screen in the inactive state so that the brightness becomes lower than the brightness of the application A which is the screen in the active state (S205). Also, the CPU 100 turns on each first touch key K11, K12 and K13, and turns off each second touch key K21, K22 and K23 (S205). For this, the user is notified that the screen of the application A displayed on the first display surface 11a1 is in the active state.

Also, when the first display surface 11a1 or the second display surface 21a1 is touched by the user (S201: YES), as shown in FIG. 7(b), when the first screen A1 and the second screen A2 of the application A are displayed on the first and the second display surface 11a1 and 21a1 (S202: YES, S204: NO), the CPU 100 displays the screen of the first display surface 11a1 and the screen of the second display surface 21a1 with the same brightness to each other. Also, the CPU 100 turns on each predetermined second touch key K21, K22 and K23, and turns off the other first touch key K11, K12 and K13 (S203).

When the operation item screen is displayed on at least one of the first display surface 11a1 and the second display surface 21a1 (S202: NO), the CPU 100 displays the screens of the first display surface 11a1 and the second display surface 21a1 at the same brightness to each other and turns on the predetermined touch keys (S203).

According to the present embodiment, while screens based on different applications or different processing are displayed on each display surface 11a1 and 21a1, a screen is displayed on the other display surface at lower brightness than the brightness of the display surface operated by the user. With the difference in the brightness of the screens, it is easy to see whether the screen displayed on the display surface is active or not.

<The Third Embodiment>

In the second embodiment, the control to distinguish a screen in an active state from a screen in an inactive state by the difference in brightness is executed. In contrast, in the third embodiment, the control to distinguish the screen in the active state from the screen in the inactive state by making the size of the inactive state screen smaller than the size of the active state screen and by turning on or off the touch keys is executed.

Figure 9:
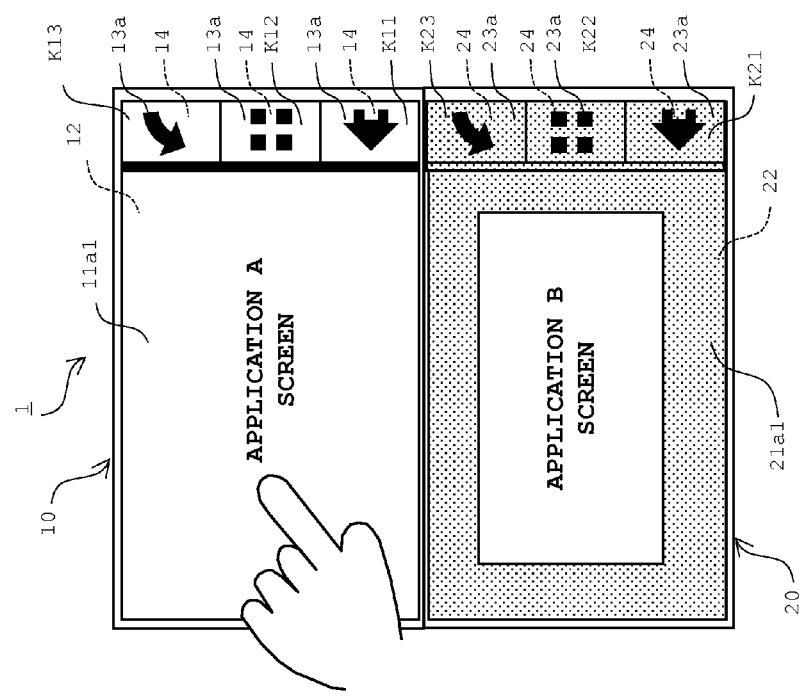
FIG. 9 is a diagram showing the screens of applications displayed on each display surface according to the embodiment.
Figure 10:
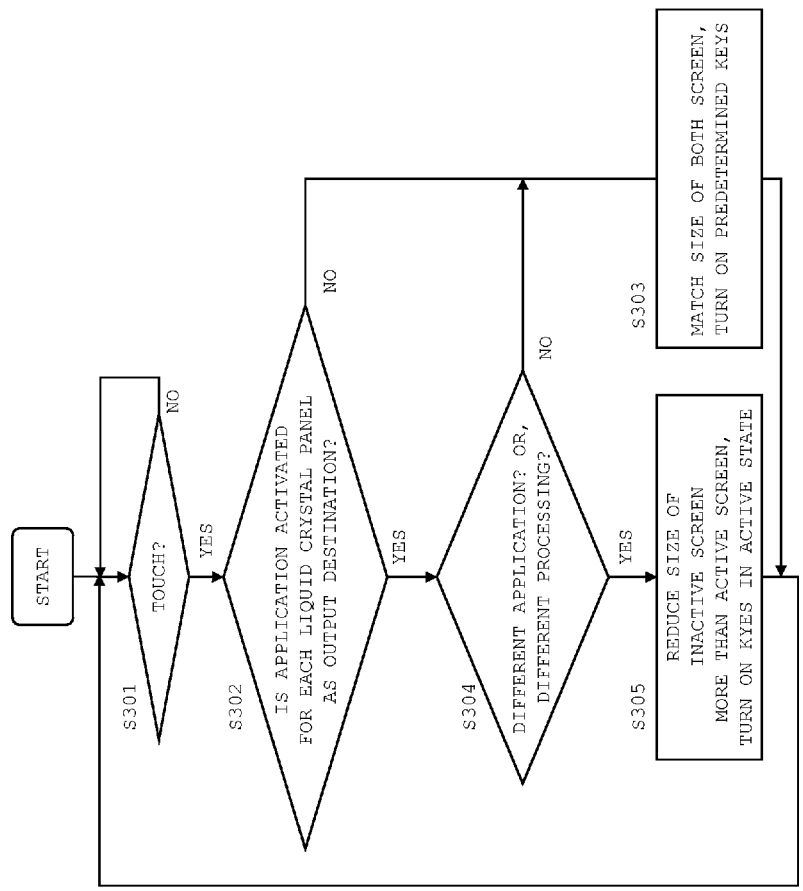
FIG. 10 is a flow chart showing procedures for processing of display controls for distinguishing the display displaying the active screen from the display displaying the inactive screen according to the embodiment.

FIG. 9 is a diagram showing a screen of an application A displayed on a first display surface 11a1 as an active screen and a screen of an application B displayed on a second display surface 21a1 as an inactive screen. FIG. 10 is a flow chart showing a processing of a display control for distinguishing a display displaying an active screen from a display displaying an inactive screen.

Since the processing of S301, S302 and S304 in FIG. 10 is the same with the processing of S101, S102 and S104 in FIG. 6, respectively, an explanation is not repeated.

As shown in FIG. 9, when the first display surface 11a1 is touched by the user (S301: YES), screens of different applications A and B are displayed on each display surface 11a1 and 21a1 (S302: YES, S204: YES). In this case, the CPU 100 reduces a size of the screen of the application B which is in the inactive state on the second display surface 21a1. The CPU 100 reduces the screen of the application B so as the size of the screen of the Application B to become smaller than the size of the screen of the application A in the active state on the first display surface 11a1. Also, the CPU 100 turns on each first touch key K11, K12 and K13 corresponding to the first display surface 11a1 and turns off each second touch key K21, K22 and K23 corresponding to the second display surface 21a1 (S305). Because of this difference in size of the screens, the user is notified that the screen of the first display surface 11a1 is in the active state.

Also, as shown in FIG. 7(b), when the first and the second display surface 11a1 and 21a1 are touched by the user (S301: YES), there is a case that the first screen A1 and the second screen A2 of the application A are displayed on the first and the second display surface 11a1 and 21a1, respectively (S302: YES, S304: NO). In this case, there is no need to define the active screen and the inactive screen, the CPU 100 does not execute the display control for distinguishing the display displaying the active screen from the display displaying the inactive screen. That is, the CPU 100 displays the screen of the first display surface 11a1 and the screen of the second display surface 21a1 in the same size (S303). Besides, the CPU 100 turns on each of the predetermined second touch key K21, K22 and K23 and turns off each of the other first touch key K11, K12 and K13 (S303).

Also in a case where the operation item screen is displayed on at least one of the first display surface 11a1 and the second display surface 21a1 (S302: NO), the CPU 100 displays the screen of the first display surface 11a1 and the screen of the second display surface 21a1 in the same size and turns on the predetermined touch keys (S303).

According to the present embodiment, while screens based on different applications or different processing are displayed on each display surface 11a1 and 21a1, a size of the inactive state screen is set smaller than the size of the active state screen. Thus, since the screen in the inactive state is displayed hard to see compared to the screen in the active state, the user can easily distinguish the screen in the active state displayed on the display surface which is an operation target from the screen in the inactive state displayed on the display surface which is not the operation target.

<Other Embodiment>

The embodiment of the present invention has been described above, but the present invention is not limited to the above embodiment. Also, the embodiment of the present invention may be variously modified.

For example, in the above embodiment, the first and the second touch keys are provided adjacent to the first and the second display 11 and 21, respectively, however the arrangement of the first and the second touch keys is not limited to this arrangement.

Also, in the above embodiment, each touch panel and each touch key are arranged on each cabinet 10 and 20, however each touch key does not need to be provided on each cabinet. In this case, with the state of the screens displayed on the display surfaces 11a1 and 21a1 of each touch panel, the screen is identified whether it is in the active state or the inactive state.

Figure 11:
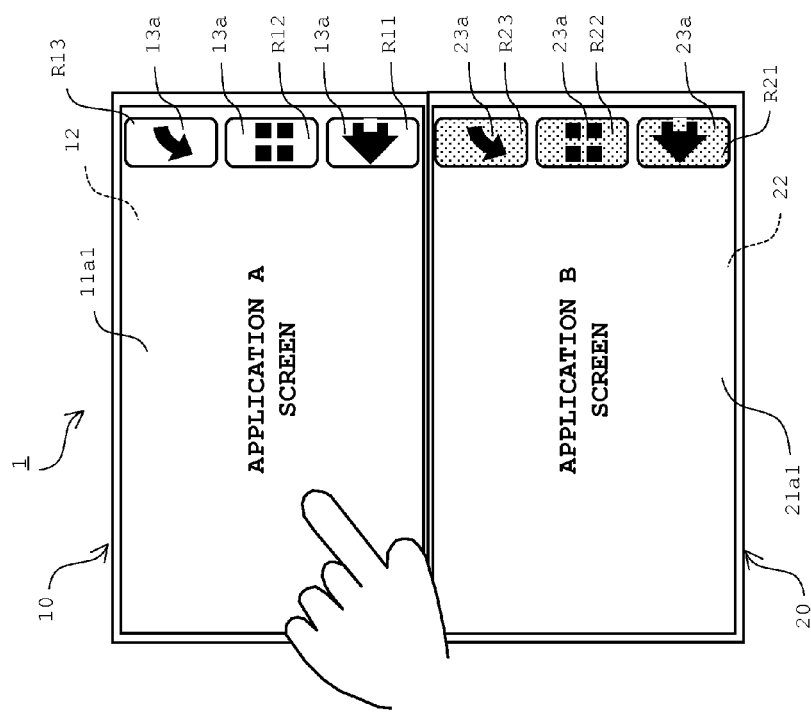
FIG. 11 is a diagram showing the screens of the application and key areas displayed on each display surface according to a modification example of the embodiment.

Further, when each touch key is not provided on each cabinet 10 and 20, as shown in FIG. 11, key areas R11, R12, R13, R21, R22 and R23 can be provided on apart of each display surface 11a1 and 21a1. As shown in FIG. 11, when the screen of the application A displayed on the display surface 11a1 is the active screen, a color tone of the key areas R21, R22 and R23 of the display surface 21a1 displaying the inactive screen is darkened, compared to the color tone of the key areas R11, R12 and R23 of the display surface 11a1 displaying the active screen. For this reason, a user can tell the state of each display surface easily, and it would be easy to see whether the input to the key areas is capable or not.

Also, in the first embodiment, in the display surface operated by the user, the bar image showing the active state is displayed and the touch keys are turned on, then the touch keys on the display surface of the inactive state are turned off. In contrast, a configuration that the bar image showing the active state is not displayed on the screen on the display surface operated by the user, but the touch keys are turned on, and the touch keys on the display surface of the inactive state are turned off can be employed. In this case, the user can tell the state of the screens easily by the on/off state of the touch key.

Moreover, the configuration that the bar image showing the active state is displayed on the screen on the display surface operated by the user, the touch keys are turned on, and further on the display surface of the inactive state, the touch keys are kept turned on can be employed. In this case, because of the bar image showing the active state, the user can tell the state of the screen easily.

Furthermore, in the first embodiment, the bar image is displayed on apart of the edge of the screen as an image showing the active state, the image showing the active state is not limited to this image. For example, an image of a frame surrounding the edges of the screen in the active state can be displayed.

Besides, in the above embodiment, a display control to distinguish the display module displaying the screen in the active state from the display module displaying the screen in the inactive state according to the images displayed on each display surface 11a1 and 21a1, a brightness of the screens, a size of the screens and a brightness of the touch keys corresponding to each display surface 11a1 and 21a1 was executed. With this kind of display control, or instead of such a display control, a control to distinguish the display module displaying the screen in the active state from the display module displaying the screen in the inactive state by sound, light, etc., can be further executed. For example, each cabinet are provided with a lamp module to display the state of the screens (the active state or the inactive state). By turning on the lamp modules of the cabinets 10 and 20 where the active screen is displayed on, with the light from the lamp modules, a state of each screen is notified.

Further, in the above embodiment, the cellular phone 1 was used, however mobile terminal devices such as a PDA, a portable game machine, etc., can be used.

The embodiment of the present invention may be modified variously and suitably within the scope of the technical idea described in claims. For example, part or all of the above embodiment can be combined.

REFERENCE SIGNS LIST

1 Cellular phone
10 First cabinet
11 First display
12 First panel sensor
13 First key display
14 First key sensor
18 Protruding portion
20 Second cabinet
21 Second display
22 Second panel sensor
23 Second key display
24 Second key sensor
27 Shaft portion
39 Guiding grooves
100 CPU

The invention claimed is:

1. A mobile terminal device, comprising:
a first touch panel comprising a first display;
a second touch panel comprising a second display: and
at least one processor that
outputs a first screen for a first application in an inactive state to the first display while outputting a second screen for a second application, that is different than the first application, in an active state to the second display, wherein the second screen in the active state comprises a linear bar image indicating an active state, while the first screen in the inactive state does not comprise the linear bar image, to thereby visually distinguish the active state of the second screen from the inactive state of the first screen,
detects that a touch to the first touch panel is performed while the first screen is being output in an inactive state to the first display while the second screen is being output in an active state to the second display, and,
in response to the detection that the touch to the first touch panel is performed while the first screen is being output in an inactive state to the first display while the second screen is being output in an active state to the second display,
switches the first screen to the active state,
switches the second screen to the inactive state, and
moves the linear bar image from the second screen to the first screen to thereby visually distinguish the active state of the first screen from the inactive state of the second screen.

2. The mobile terminal device according to claim 1, wherein screen in the inactive state is further visually distinguished from a screen in the inactive state by having a higher brightness.

3. The mobile terminal device according to claim 1, wherein a screen in the inactive state is further visually distinguished from a screen in the inactive state by having a larger size.

4. The mobile terminal device according to claim 1, wherein the first display includes a first key area for inputting a predetermined information, wherein the second display includes a second key area for inputting a predetermined information, and wherein the at least one processor, in response to the detection that the touch to the first touch panel is performed while the first screen is being output in an inactive state to the first display while the second screen is being output in an active state to the second display, further darkens the second key area of the second display.

5. The mobile terminal device according to claim 1, further comprising:
a first key module for inputting predetermined information, capable of being lit and provided corresponding to the first touch panel; and
a second key module for inputting predetermined information, capable of being lit and provided corresponding to the second touch panel.
wherein the at least on processor, in response to the detection that the touch to the first touch panel is performed while the first screen is being output in an inactive state to the first display while the second screen is being output in an active state to the second display, further darkens the second key module.

6. The mobile terminal device according to claim 1, further comprising:
a first cabinet having the first touch panel;
a second cabinet comprising the second touch panel; and
a mechanical part which connects the first cabinet and the second cabinet such that the first and second cabinets are switchable between a first configuration, in which the first touch panel is exposed externally and the second touch panel is covered by the first cabinet, and a second configuration, in which at least a part of the second touch panel and the first touch panel are exposed externally.

7. A non-transitory storage medium storing a computer program which, when executed by a processor, causes the processor to:
outputs a first screen for a first application in an inactive state to a first display of a first touch panel while outputting a second screen for a second application, that is different than the first application, in an active state to a second display of a second touch panel, that is different than the first touch panel, wherein the second screen in the active state comprises a linear bar image indicating an active state, while the first screen in the inactive state does not comprise the linear bar image, to thereby visually distinguish the active state of the second screen from the inactive state of the first screen;
detect that a touch to the first touch panel is performed while the first screen is being output in an inactive state to the first display of the first touch panel while the second screen is being output in an active state to the second display of the second touch panel; and,
in response to the detection that the touch to the first touch panel is performed while the first screen is being output in an inactive state to the first display while the second screen is being output in an active state to the second display,
switch the first screen to the active state,
switch the second screen to the inactive state, and
move the linear bar image from the second screen to the first screen to thereby visually distinguish the active state of the first screen from the inactive state of the second screen.

8. A control method of a mobile terminal device comprising a first touch panel comprising a first display, and a second touch panel comprising a second display, wherein the control method comprises:
outputting a first screen for a first application in an inactive state to the first display while outputting a second screen for a second application, that is different than the first application, in an active state to the second display, wherein the second screen in the active state comprises a linear bar image indicating an active state, while the first screen in the inactive state does not comprise the linear bar image, to thereby visually distinguish the active state of the second screen from the inactive state of the first screen;
detecting that a touch to the first touch panel is performed while the first screen is being output in an inactive state to the first display while the second screen is being output in an active state to the second display; and,
in response to the detection that the touch to the first touch panel is performed while the first screen is being output in an inactive state to the first display while the second screen is being output in an active state to the second display,
switching the first screen to the active state,
switching the second screen to the inactive state, and
moving the linear bar image from the second screen to the first screen to thereby visually distinguish the active state of the first screen from the inactive state of the second screen.

9. The mobile terminal device according to claim 1,
wherein the first display includes a first key area for inputting a predetermined information,
wherein the second display includes a second key area for inputting a predetermined information, and
wherein the at least one processor, in response to the detection that the touch to the first touch panel is performed while the first screen is being output in an inactive state to the first display while the second screen is being output in an active state to the second display, displays the linear bar image adjacent to the first key area.

10. The non-transitory storage medium according to claim 7,
wherein the first display includes a first key area for inputting a predetermined information,
wherein the second display includes a second key area for inputting a predetermined information, and
wherein the computer program, when executed by a processor, further causes the processor to, in response to the detection that the touch to the first touch panel is performed while the first screen is being output in an inactive state to the first display while the second screen is being output in an active state to the second display, display the linear bar image adjacent to the first key area.

11. The method according to claim 8,
wherein the first display includes a first key area for inputting a predetermined information,
wherein the second display includes a second key area for inputting a predetermined information, and
wherein the method further comprises, in response to the detection that the touch to the first touch panel is performed while the first screen is being output in an inactive state to the first display while the second screen is being output in an active state to the second display, displaying the linear bar image adjacent to the first key area.

* * * * *